US011036400B2

(12) United States Patent
Hebsur et al.

(10) Patent No.: US 11,036,400 B2
(45) Date of Patent: Jun. 15, 2021

(54) SYSTEM AND METHOD FOR LIMITING RESTORATION ACCESS

(71) Applicant: EMC IP Holding Company LLC, Hopkinton, MA (US)

(72) Inventors: Sudha Vamanraj Hebsur, Bangalore (IN); Shelesh Chopra, Bangalore (IN); Vipin Kumar Kaushal, Bharthana Etawah (IN); Nitin Anand, Bangalore (IN); Krishnendu Bagchi, Bangalore (IN); Matthew Dickey Buchman, Seattle, WA (US); Pallavi Prakash, Bangalore (IN); Gajendran Raghunathan, Bangalore (IN); Niketan Narayan Kalaskar, Bangalore (IN); Anand Reddy, Bangalore (IN); Jaishree Balasubramanian, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/395,373

(22) Filed: Apr. 26, 2019

(65) Prior Publication Data
US 2020/0341658 A1 Oct. 29, 2020

(51) Int. Cl.
*G06F 3/06* (2006.01)
*G06F 3/0482* (2013.01)

(52) U.S. Cl.
CPC ............ *G06F 3/0622* (2013.01); *G06F 3/065* (2013.01); *G06F 3/0619* (2013.01); *G06F 3/0637* (2013.01); *G06F 3/0659* (2013.01); *G06F 3/0673* (2013.01); *G06F 3/0482* (2013.01)

(58) Field of Classification Search
CPC .... G06F 11/2094; G06F 16/27; G06F 16/288; G06F 3/0644; G06F 11/2023; G06F 2009/45562; G06F 11/14; G06F 11/1448; G06F 11/1451; G06F 11/1469; G06F 11/1484; G06F 16/215; G06F 16/9024; G06F 3/0482; G06F 3/0619; G06F 3/0622; G06F 3/0637; G06F 3/065; G06F 3/0659; G06F 3/0673
USPC ........................................................ 711/162
See application file for complete search history.

(56) References Cited

U.S. PATENT DOCUMENTS

| 7,395,244 | B1 | 7/2008 | Kingsford |
| 8,510,271 | B1 | 8/2013 | Tsaur et al. |
| 8,554,918 | B1 | 10/2013 | Douglis |
| 9,037,547 | B1 | 5/2015 | Shivdeo |

(Continued)

OTHER PUBLICATIONS

Extended European Search Report issued in corresponding European Application No. 20166272.3, dated Sep. 28, 2020.

(Continued)

*Primary Examiner* — Hashem Farrokh
(74) *Attorney, Agent, or Firm* — Chamberlain, Hrdlicka, White, Williams & Aughtry

(57) ABSTRACT

A backup storage includes persistent storage and a backup manager. The persistent storage stores backups of entities and an entity list that lists the entities. The backup manager obtains a restoration availability request from a user; filters the entity list based on an identity of the user to obtain an available entity list; identifies, based on user input obtain based on the available entity list, an entity of the entities; and restores the entity using the backups.

17 Claims, 12 Drawing Sheets

(56) References Cited

U.S. PATENT DOCUMENTS

| | | | |
|---|---|---|---|
| 9,092,248 B1 | 7/2015 | Makin et al. | |
| 9,256,725 B2 * | 2/2016 | Oprea | G06F 21/445 |
| 9,311,375 B1 | 4/2016 | Naik | |
| 9,646,256 B2 | 5/2017 | Chamness | |
| 9,658,925 B1 | 5/2017 | Damodharan et al. | |
| 9,740,577 B1 | 8/2017 | Chakraborty et al. | |
| 9,805,075 B1 | 10/2017 | Bachu | |
| 9,977,704 B1 | 5/2018 | Chopra et al. | |
| 10,061,657 B1 | 8/2018 | Chopra et al. | |
| 10,216,583 B1 | 2/2019 | Krinke | |
| 2004/0098423 A1 | 5/2004 | Chigusa | |
| 2007/0239755 A1 * | 10/2007 | Mahoney | G06Q 10/107 |
| 2008/0244601 A1 | 10/2008 | Zeis | |
| 2009/0320029 A1 | 12/2009 | Kottomtharayil | |
| 2010/0122248 A1 | 5/2010 | Robinson et al. | |
| 2014/0059209 A1 | 2/2014 | Alnoor | |
| 2014/0095817 A1 | 4/2014 | Hsu et al. | |
| 2015/0234713 A1 | 8/2015 | Shimada | |
| 2018/0032409 A1 | 2/2018 | Surakanti et al. | |
| 2018/0067819 A1 | 3/2018 | Kotha | |
| 2018/0225311 A1 * | 8/2018 | Bandopadhyay | G06F 16/2379 |
| 2019/0095452 A1 | 3/2019 | Whitmer | |
| 2019/0286530 A1 | 9/2019 | Talley et al. | |
| 2020/0007620 A1 | 1/2020 | Das et al. | |
| 2020/0183652 A1 * | 6/2020 | Krebs | G06F 16/903 |

OTHER PUBLICATIONS

Extended European Search Report issued in corresponding European Application No. 20168729.0, dated Sep. 8, 2020.
Extended European Search Report issued in corresponding European Application No. 20169836.2, dated Sep. 8, 2020.

\* cited by examiner

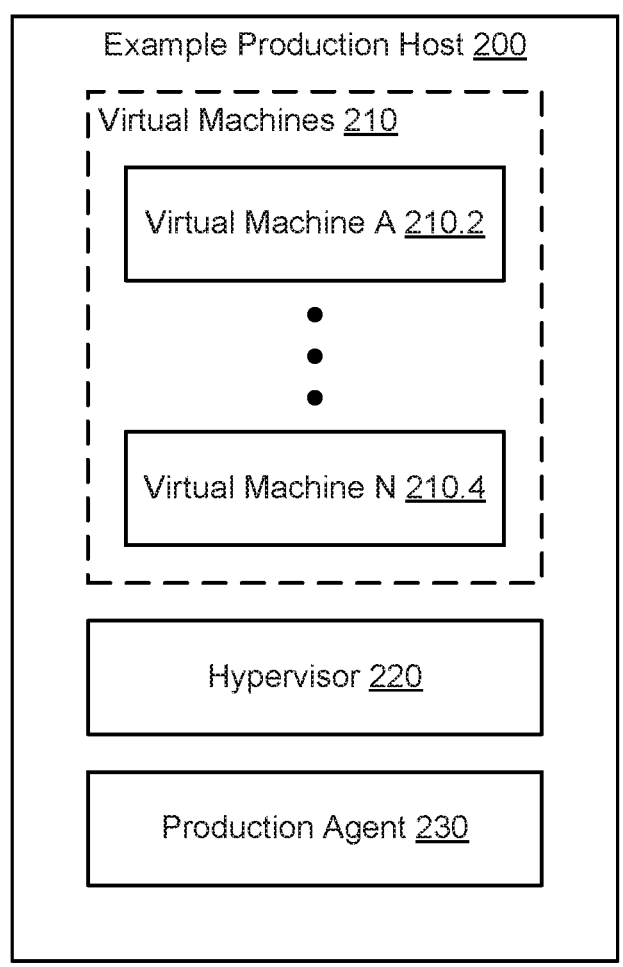
FIG. 2.1

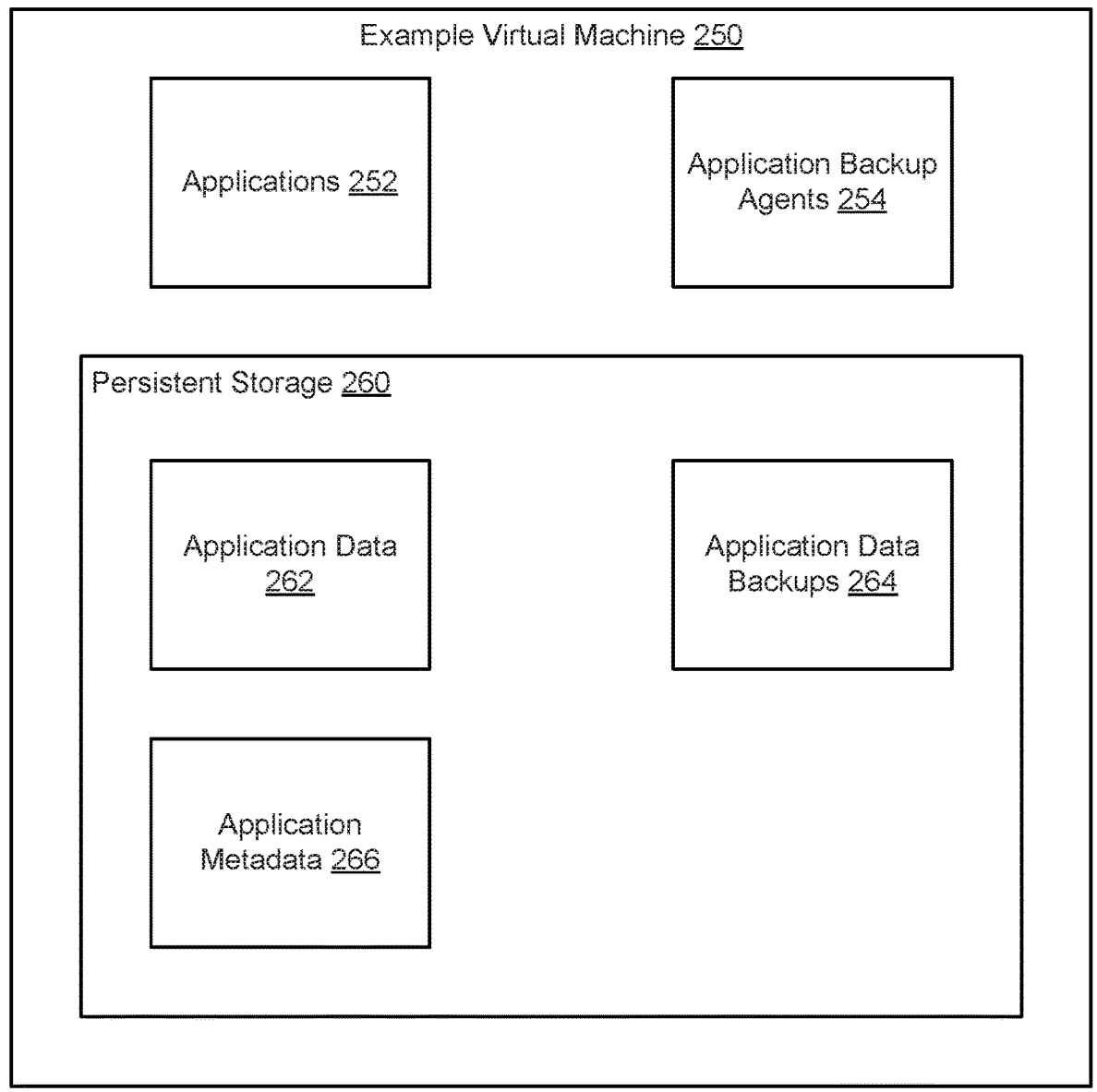
FIG. 2.2

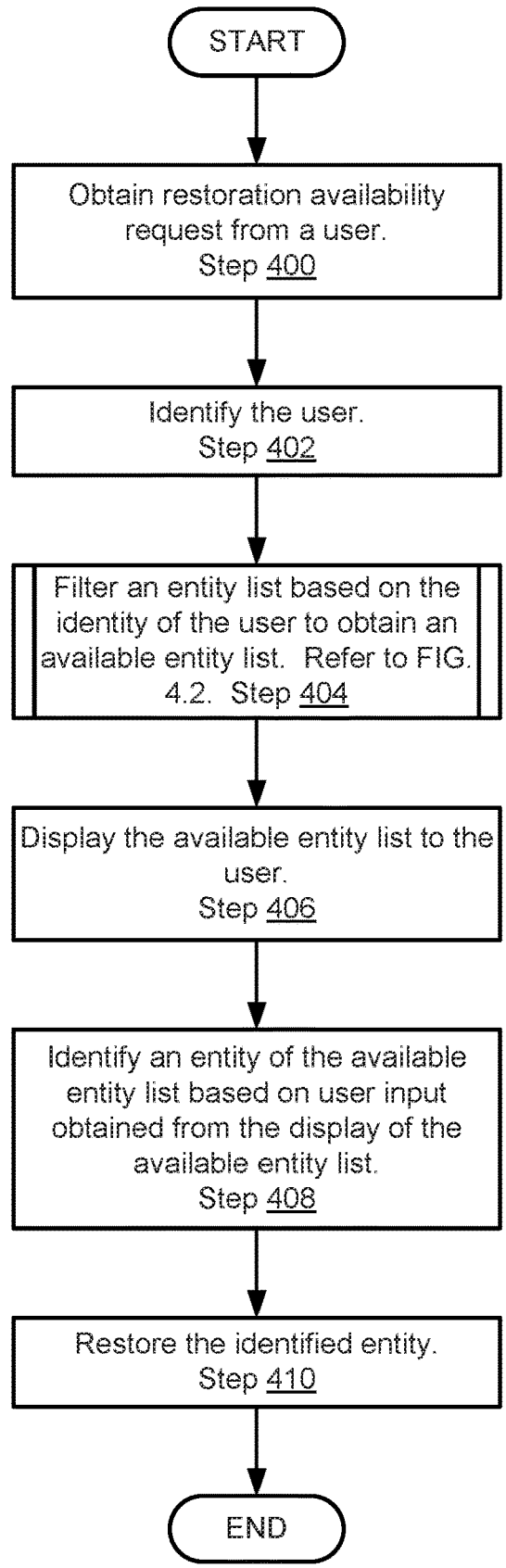
FIG. 4.1

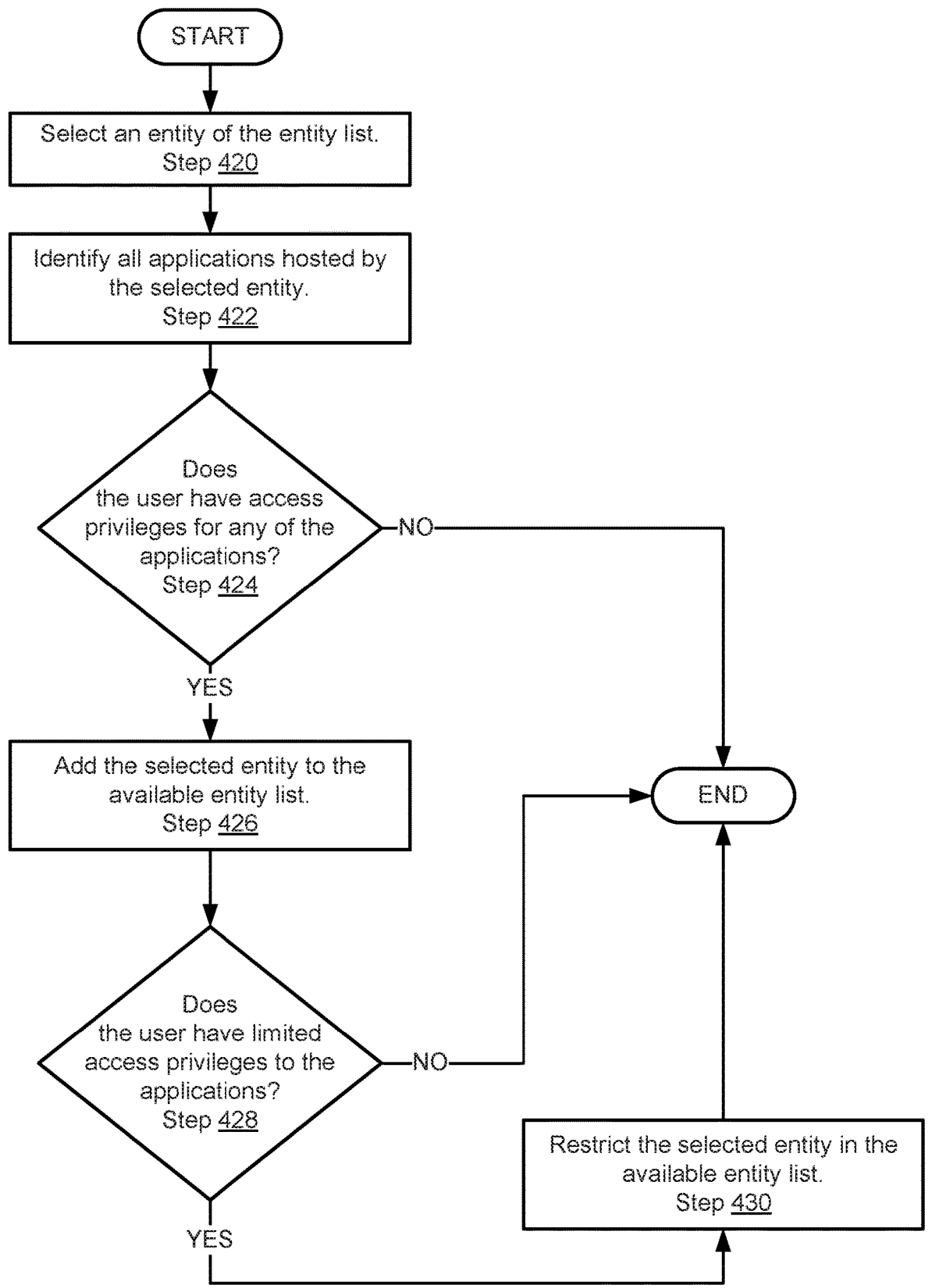
FIG. 4.2

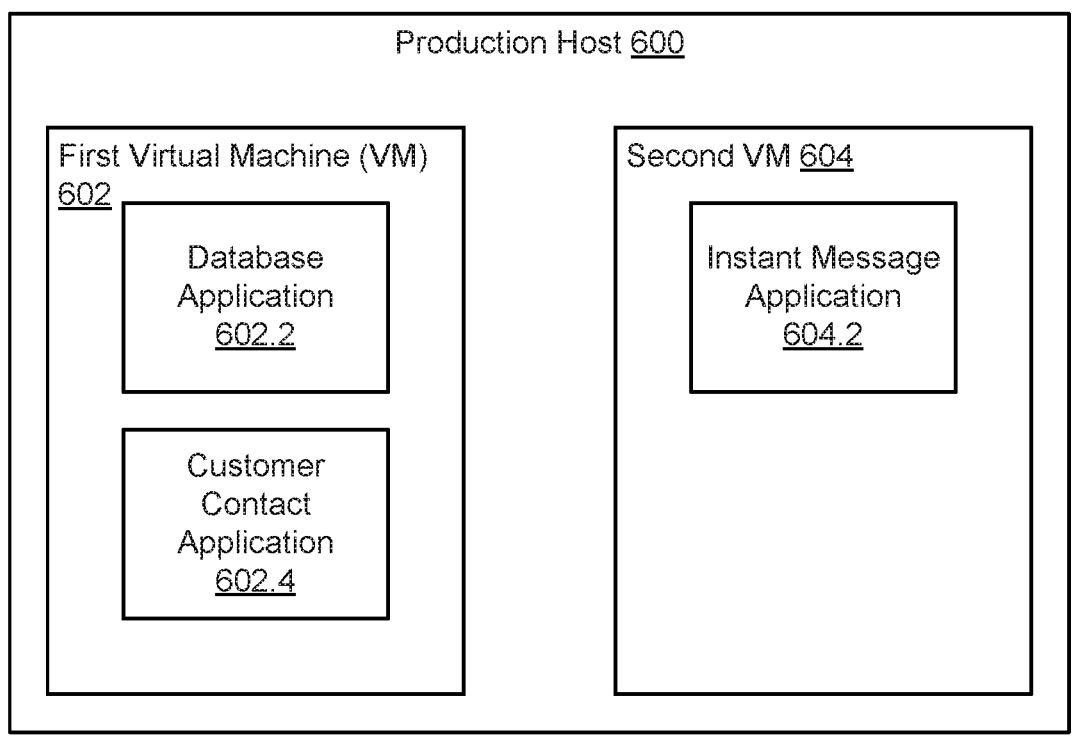
FIG. 6.1
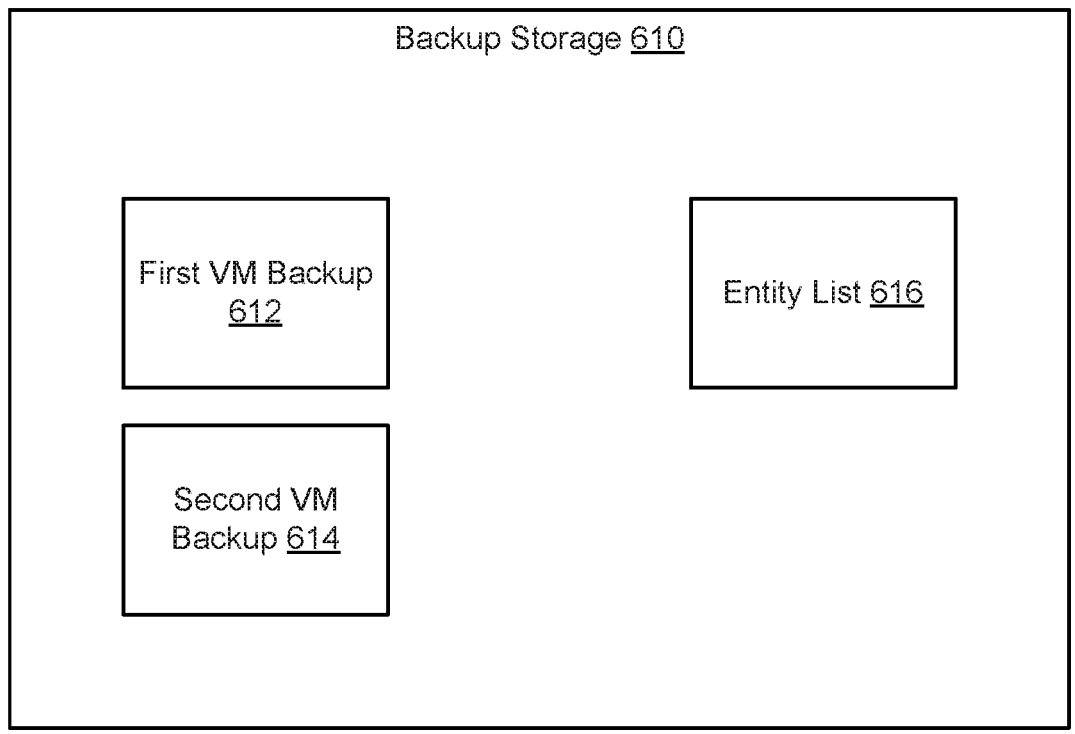
FIG. 6.2

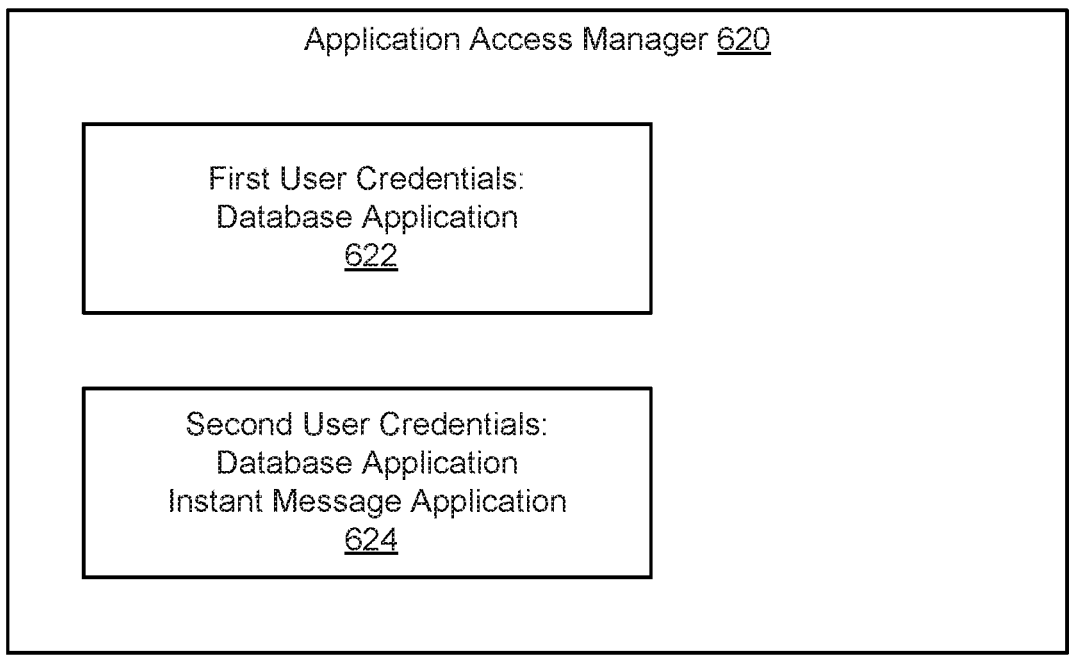
FIG. 6.3
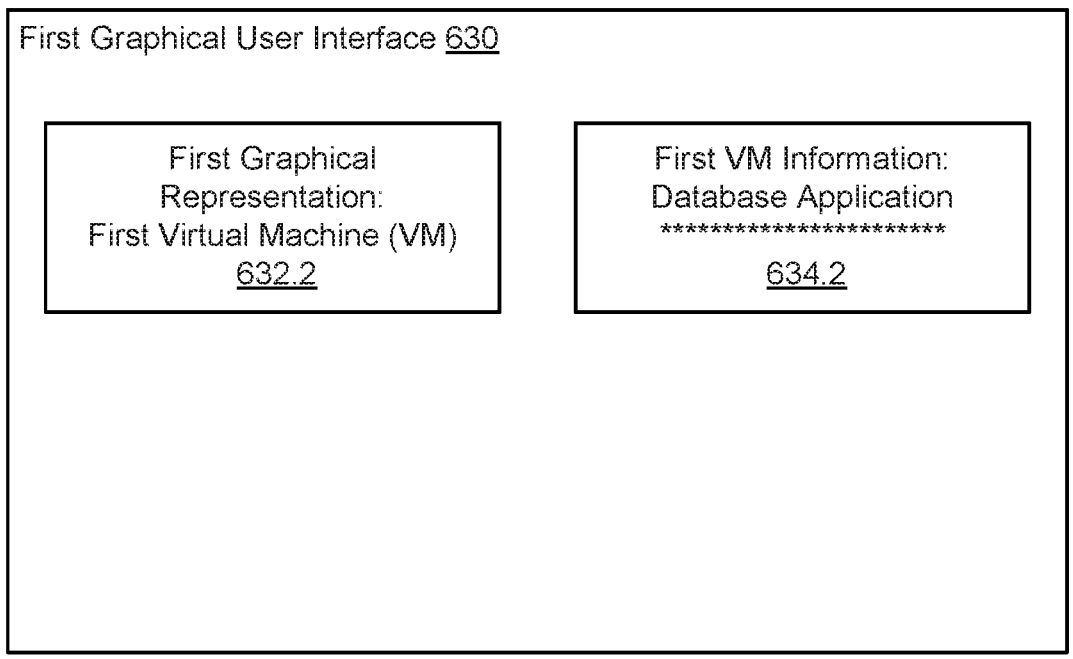
FIG. 6.4

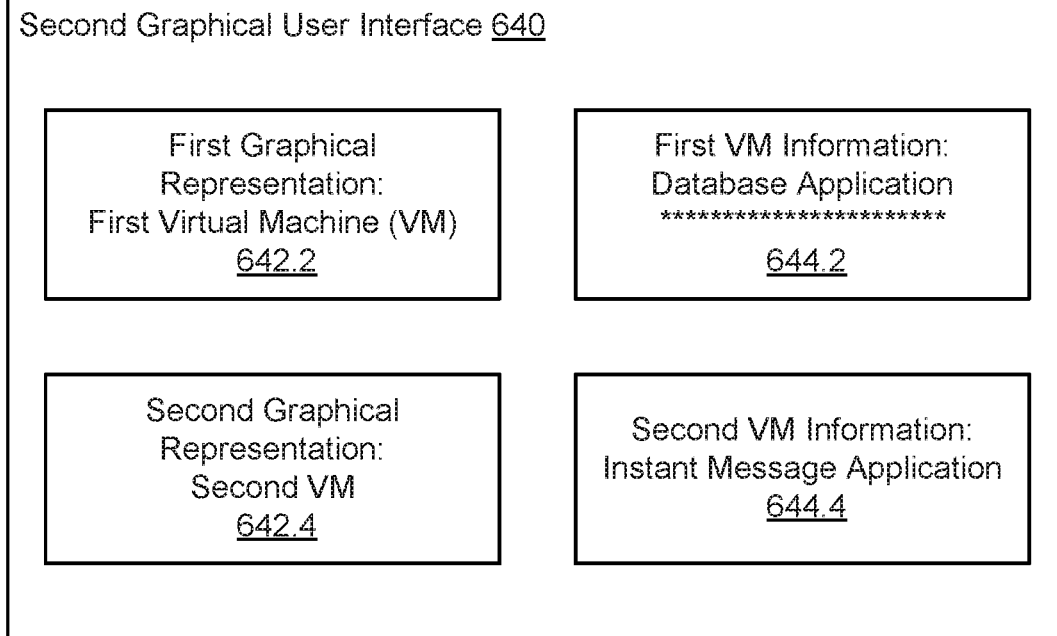
FIG. 6.5
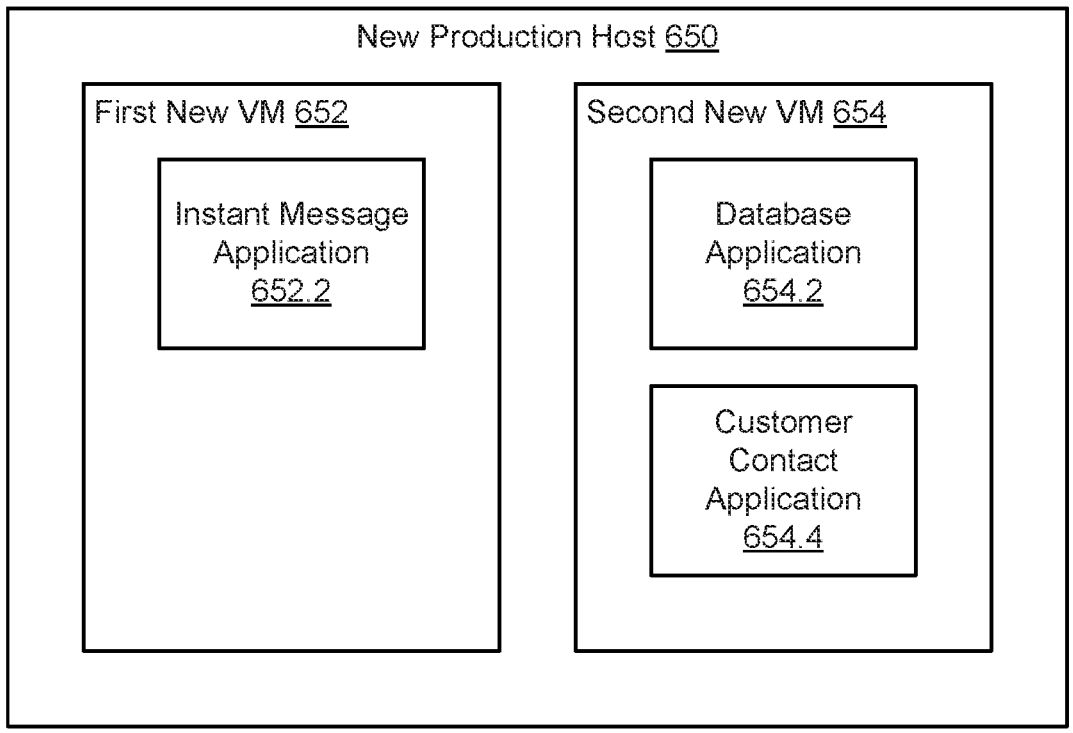
FIG. 6.6

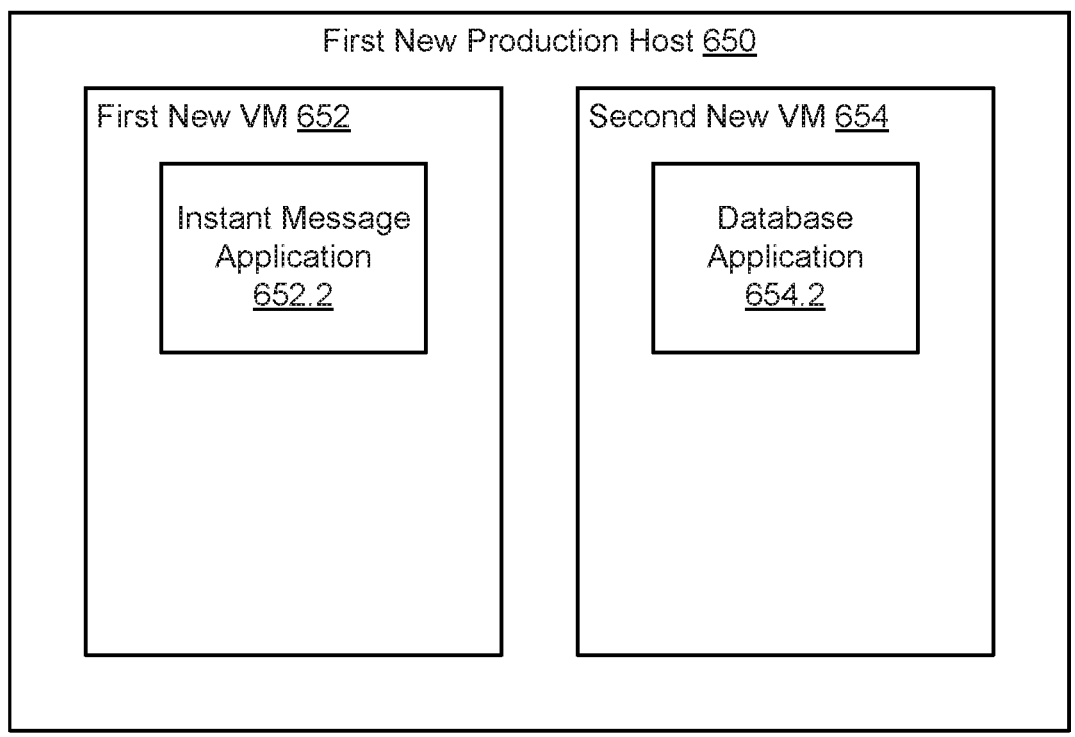
FIG. 6.7

SYSTEM AND METHOD FOR LIMITING RESTORATION ACCESS

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

SUMMARY

In one aspect, a backup storage in accordance with one or more embodiments of the invention includes persistent storage and a backup manager. The persistent storage stores backups of entities and an entity list that lists the entities. The backup manager obtains a restoration availability request from a user; filters the entity list based on an identity of the user to obtain an available entity list; identifies, based on user input obtain based on the available entity list, an entity of the entities; and restores the entity using the backups.

In one aspect, a method for performing restorations in accordance with one or more embodiments of the invention includes obtaining a restoration availability request from a user; filtering an entity list based on an identity of the user to obtain an available entity list, the entity list specifies the entities available for the restorations; identifying, based on user input obtain based on the available entity list, an entity of the entities; and restoring the entity using a backup of the entities.

In one aspect, a non-transitory computer readable medium in accordance with one or more embodiments of the invention includes computer readable program code, which when executed by a computer processor enables the computer processor to perform a method for performing restorations. The method includes obtaining a restoration availability request from a user; filtering an entity list based on an identity of the user to obtain an available entity list, the entity list specifies the entities available for the restorations; identifying, based on user input obtain based on the available entity list, an entity of the entities; and restoring the entity using a backup of the entities.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an example virtual machine in accordance with one or more embodiments of the invention.

FIG. 4.1 shows a flowchart of a method of performing a restoration in accordance with one or more embodiments of the invention.

FIG. 4.2 shows a flowchart of a method of filtering an entity list in accordance with one or more embodiments of the invention.

FIGS. 6.1-6.7 shows a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services. Embodiments of the invention may provide a method for restoring entities using previously generated backups that limits access to information regarding the previously generated backups. By doing so, unauthorized users may be prevented from using restoration functionality of the system to access the data contained in the backups.

To provide the aforementioned functionality, a system in accordance with embodiments of the invention may characterize backups as the backups are generated to identify the contents of the backups. The contents of the backups may be used to determine access restrictions that will be placed on users when restorations are performed. By restricting the ability of users to initiate restorations, the likelihood of unauthorized users gaining access to access controlled information may be reduced.

Figure 1:
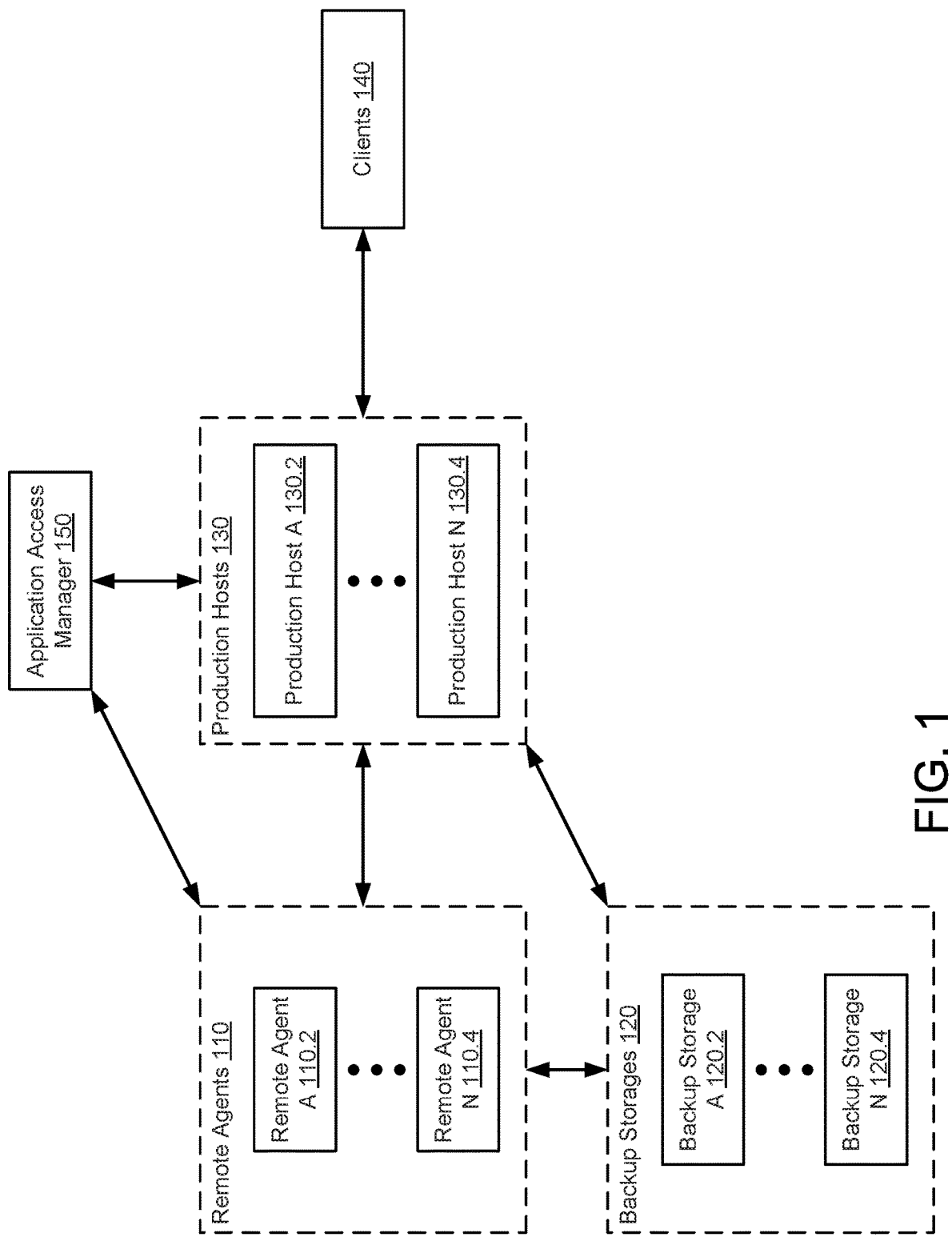
FIG. 1 shows a diagram of a system in accordance with one or more embodiments of the invention.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services of the applications. The applications may be, for example, database applications, electronic communication applications, file storage applications, and/or any other type of application that may provide services to the clients (140). By utilizing such services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

The system may also include remote agents (110) that provide data protection services to the production hosts (130). The data protection services may include orchestrating generation and storage of backups in the backup storages and/or orchestrating restorations using the data stored in the backup storages (120). Performing a restoration of a production host (e.g., 130.2, 130.4) may return the production host, or an entity hosted by the production host, to a previous state.

The system may further include an application access manager (150). The application access manager (150) may control the ability of clients (140) to access applications and/or application data hosted by the production hosts (130). For example, the components of the system of FIG. 1 may utilize access credentials managed by the application access manager (150) when the clients (140) and/or other entities request access to application services and/or to perform restorations of entities hosted by the production hosts (130).

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4.1-5. The clients (140) may be other types of computing devices without departing from the invention. For additional details regarding computing devices, refer to FIG. 7.

The clients (140) may be logical devices without departing from the invention. For example, the clients (140) may be virtual machines that utilize computing resources of any number of physical computing devices to provide the functionality of the clients (140). The clients (140) may be other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services provided by an application of the production hosts (130) by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or portions of the production hosts, in the backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4.1-5. The production hosts (130) may be other types of computing devices without departing from the invention. For additional details regarding computing devices, refer to FIG. 7.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services such as, for example, generating and storing backups in backup storages (120). By storing backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130.2) suffers a catastrophic failure or other type of data loss/corruption event, the data on the production host's persistent storage may be lost. However, because copy of the data may be stored in the backup storages (120), it may be possible to retrieve the data for use after the catastrophic failure. Thus, embodiments of the invention may improve the reliability of data storage in a distributed system.

Backup services may also include performing restorations of the production hosts (130) and/or entities hosted by the production hosts (130). For example, after a virtual machine hosted becomes inoperable due to a software error, a copy of the virtual machine may be instantiated using backups stored in backup storage as part of a restoration. By doing so, the functionality of the now-inoperable virtual machine may be restored. As discussed above, a restoration of an entity may restore the entity to a previous state. Restoration of entities to previous states may be limited depending on the types of backups stored in the backup storages (120).

In one or more embodiments of the invention, the production hosts (130) perform backup services under the direction of the remote agents (110). For example, the production hosts (130) may receive instructions from the remote agents with respect to backup services and take action in response instructions. In one or more embodiments of the invention, each of the production hosts (130) includes one or more production agents that are tasked with performing backup services in accordance with instructions sent by remote agents (110). For example, the remote agents (110) may send instructions to the production agents regarding the performance of backup services. In response to receipt of the instructions, the production hosts (130) may act to perform backup services in compliance with the received instructions. By doing so, backups of the production hosts (130) may be generated and stored in backup storage. Similarly, restorations of productions hosts (130) may be performed using the previously stored information in the backup storages (120). For additional details regarding the production hosts (130), refer to FIG. 2.1.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 4.1-5. The backup storages (120) may be other types of computing devices without departing from the invention. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) are distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored by the backup storages (120) includes backups of virtual machines and/or applications hosted by the production hosts (130). For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore virtual machine hosting the database to a state associated with the backup, i.e., the desired previous state.

Additionally, application level backups may be stored in backup storage (120), rather than in virtual machine level backups. Thus, backups of the production hosts (130) may be generated at any level of granularity with respect to the data stored in the production hosts (130). Combinations of virtual machine level backups and application level backups may be utilized to selective restore the functionality of virtual machines and/or applications hosted by virtual machines.

For example, to restore an application to a desired state a virtual machine backup may be used to instantiate a copy of a virtual machine that hosts an application in an undesirable state. After instantiating the virtual machine, an application level backup may be used to restore the state of the application hosted by the virtual machine to the desired state. Thus, the state of the application may be in the desired state while the state of the virtual machine may be in another state (but does not impact the functionality of the now-desirable state of the application).

In one or more embodiments of the invention, the backup storages (120) limit access to backups depending on the identity of a requesting entity. For example, when an entity requests a list of restorable entities using backup stored in the backup storages (120), the backup storages (120) may: (i) determine an identify of the entity, (ii) determine whether the identified entity has permission to utilizes the applications and/or data hosted by restorable entities, (iii) generate an available entity list that is a filtered representation of all of the entities that may be restored using data in the backup storages (120), and (iv) limit the ability of the entity to only restore entities listed on the available entity list. By doing so, malicious parties that may desire to utilize restoration functionality to gain access to data may be prevented from access to the desired data.

When determine whether to limit access to backups, the backup storages (120) may utilize the application access manager (150) to determine whether to allow access. For example, the backup storages (120) may query the application access manager (150) to determine whether a particular client, or user utilizing the client, has sufficient access rights to access the applications and/or application data hosted by a virtual machine for which a restoration request has been received. If insufficient access credentials are available to a requesting entity, access to the backups stored in the backup storages (120) may be limited to the requested entity.

While described above as storing backups of virtual machines, applications, and/or production hosts (130), the backup storages (120) may store other types of data from the production hosts (130), or other entities, without departing from the invention. For example, the backup storages (120) may store archives or other data from the clients (140) or other entities. For additional details regarding backup storages, refer to FIG. 3

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the remote agents (110) described through this application and all, or a portion, of the methods illustrated in FIG. 4.1-5. The remote agents (110) may be other types of computing devices without departing from the invention. For additional details regarding computing devices, refer to FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across any number of separate and/or distinct computing devices. In such a scenario, the functionality of the remote agents (110) may be performed by multiple, different computing devices without departing from the invention.

In one or more embodiments of the invention, the remote agents (110) orchestrate provisioning of backup services to the production hosts (130). For example, the remote agents (110) may initiate the process of backup generation for the production hosts (130) and storage of the generated backups in the backup storages (120). Additionally, the remote agents (110) may orchestrate restoration of the production hosts (130) using backups stored in the backup storages (120). For example, remote agents (110) may initiate copying of backups from the backup storages to the production hosts and initiation of restoration using the copied backups. The system of FIG. 1 may include any number of remote agents (e.g., 110.2, 110.4).

In one or more embodiments of the invention, the application access manager is a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the application access manager (150) described throughout this application and all, or a portion, of the methods illustrated in FIG. 4.1-5. The application access manager (150) may be another type of computing device without departing from the invention. For additional details regarding computing devices, refer to FIG. 7.

In one or more embodiments of the invention, the application access manager (150) is a distributed computing device. As used herein, a distributed computing device refers to functionality provided by a logical device that utilizes the computing resources of one or more separate and/or distinct computing devices. For example, in one or more embodiments of the invention, the application access manager (150) is a distributed device that includes components distributed across any number of separate and/or distinct computing devices. In such a scenario, the functionality of the application access manager (150) may be performed by multiple, different computing devices without departing from the invention.

In one or more embodiments of the invention, the application access manager (150) provides credential management services. Credential management services may include determining whether an entity is authorized to access applications and/or application data. For example, a production host may query the application access manager (150) to determine whether a user operating a client is authorized to use a particular application hosted by the production hosts (130). The application access manager (150) may compare the identity of the user to a list of authorized user to make the determination and report the determination and/or the list of authorized users to the production host. By doing so, production hosts may determine whether a particular user is authorized to utilize any application hosted by the production hosts (130) and/or application data hosted by the production hosts (130).

Similarly, the backup storages (120) may query the application access manager (150) to determine whether a user has sufficient access credentials to perform a restoration that implicates an application and/or application data. For example, when a user requests access to a list of entities that may be restored, the backup storages (120) may restrict access to such information on the basis of the identity of the user by querying the application access manager (150) to determine whether a particular user has sufficient access credentials to allow such a restoration to be performed.

If the user does not have sufficient access credentials, only a limited list of entities available for restoration may be presented to the user. By doing so, malicious parties that may desire to nefariously access data hosted by a newly restored entity may be thwarted from obtaining access to the data.

To provide the aforementioned functionality of the application access manager (150), the application access manager (150) may store a list, or other data structure, that specifies the relevant access credentials of each user. The list may be continuously updated using any method without departing from the invention.

In one or more embodiments of the invention, the application access manager (150) pushes a copy of the list to one or more of the components of FIG. 1. By doing so, each of the components of the system of FIG. 1 (remote agents, production hosts, and backup storages) may be continuously updated regarding the access credential status of each user.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production hosts (200) may provide: (i) application services to the clients, (ii) backup services to the entities that provide the application services to the clients, and (iii) restoration services.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200). In other words, each of the virtual machines (210) may be implemented as computer instructions stored on a persistent storage that when executed by a processor of the example production host (200) give rise the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, filesharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage.

In some embodiments of the invention, portions, or all, of the application data may be stored remotely from the example production host (200). For example, the application data may be stored in a second production host, or another entity, that does not host the applications. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized entity. For additional details regarding the virtual machines (210), refer to FIG. 2.2.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate a portion of the persistent storage of the example production host (200). Any quantity of storage resources of the persistent storage may be allocated in any manner in any scheme among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210). For example, the production agent (230) may orchestrate the generation of backups and storage of the generated backups in backup storage. To orchestrate the generation of backups, the production agent (230) may generate virtual machine level backups and application level backups. A virtual machine level backup may be a backup that represents the state (or difference from one state to another state) of a virtual machine at a point in time. An application level backup may be a backup that represents the state (or difference from one state to another state) of an application hosted by a virtual machine at a point in time. Different types and/or combinations of backups may be used to restore virtual machines and/or applications hosted by virtual machines (or natively executing on a production host) to states associated with different points in time.

In one or more embodiments of the invention, the production agent (230) manages the provisioning of backup services the virtual machines (210) based on instructions received from one or more remote agents. These instructions may cause the production agent (230) to take action to provide the backup services.

In one or more embodiments of the invention, the instructions from remote agents specify that backups are to be generated dynamically. For example, instructions may specify that backups are to be generated in response to predetermined events rather than at a particular point in time. The predetermined event may be the storage of a predetermined quantity of data by an entity hosted by the example production host (200) after a predetermined point in time.

For example, consider a scenario in which a remote agent sends an instruction to a production agent that specifies that backups for a virtual machine hosted by the example production host (200) are to be generated whenever the virtual machine stores 200 Gigabytes (GB) of data. In response to this instruction, the production agent (230) may monitor, or otherwise set up watches for, the data storage of the virtual machine. When the data storage of the virtual machine reaches 200 GB, the production agent may initiate a backup generation for the virtual machine.

In one or more embodiments of the invention, the production agent (230) includes functionality to report backup generation activity to remote agents. For example, the production agent (230) may monitor backups that are generated and send notifications of the generated backups to the remote agents. By doing so, remote agents may be notified of the backup generations for the entities hosted by the example production host (200).

The production agent (230) may also provide restoration services. Restoration services may enable entities that are now inaccessible due to, for example, failure of a host entity such as a production host to be instantiated in other locations and being in predetermined states. To provide restoration services, the production agent (230) may obtain any number of backups from backup storage and restore the entity using the backups. For example, a production agent (230) may obtain a virtual machine level backup and an application level backup. The virtual machine level backup may be an image of a virtual machine and may be utilized to instantiate a copy of a virtual machine. After instantiating a copy of the virtual machine, the application level backup may be utilized to restore a state of an application hosted by the instantiated virtual machine. By doing so, a virtual machine hosting an application in a predetermined state may be obtained. Once in the predetermined state, the application may provide desired application services and/or enable access to application data of the application. The entities may be restored to different, desirable states using different combinations of previously generated backups. Any combination of backups may be used to restore entities without departing from the invention.

To provide the above noted functionality of the production agent (230), the production agent (230) may perform all, or portion, of the methods illustrated in FIGS. 4.1-5.

In one or more embodiments of the invention, the production agent (230) is a hardware device including circuitry. The production agent (230) may be, for example, a digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, virtual machines hosted by the production host may provide services to clients. FIG. 2.2 shows a diagram of an example virtual machine (250) in accordance with one or more embodiments of the invention.

The example virtual machine (250) may host any number and type of applications (252). The applications (252) may provide services to clients and/or other entities. The applications (252) may generate application data (262) stored in persistent storage (260).

In one or more embodiments of the invention, the persistent storage (260) is a logical storage (e.g., virtualized storage) that utilizes any quantity of hardware storage resources of a production host (and/or other entity) that hosts the example virtual machine (250). For example, the persistent storage (320) may utilize portions of any combination of hard disk drives, solid state disk drives, tape drives, and/or any other physical storage medium of a production host and/or other entity for providing storage resources. Such storage resources may be used to store the application data (262) and/or other data structures.

The example virtual machine (250) may also host any number of application backup agents (254). The application backup agents (254) may provide backup and/or restoration services for the applications (252). In other words, the application backup agents (254) may provide application level backup and/or restoration services, much like the production agent (230, FIG. 2.1) but at an application rather than virtual machine level. The application backup agents (254) may be separate from the applications (252) and/or native functionality of the applications (252).

The application backup agents (254) may provide backup and/or restoration services under the direction of a production agent or other entity. In other words, the actions of the application backup agents (254) may be orchestrated by other entities. For example, a production agent may send commands to the application backup agents (254) to invoke their functionality. In this manner, system level backup functionality may be orchestrated at different levels of granularity, e.g., backups of virtual machines and/or application may be selectively generated by invoking the functionality of production agents and/or application backup agents (254).

When generating backups, the application backup agents (254) may generate application data backups (264). Such backups may be data structures that reflect a state of an application (or a difference between the current a previous state) at a particular point in time. Application data backups (264) may be used to restore an application to a state associated with the application data backups (264). Once generated, copies of the application data backups (264) may be sent to backup storages for long term storage.

The application backup agents (254) may also generate application metadata (266) when an application data backup is generated. The application metadata (266) may include information regarding which users have sufficient access credentials to access the applications associated with each application data backup. In other words, when a backup of an application is generated, corresponding metadata that reflects the access credentials of the users that have sufficient privileges to access the application is generated. The application data backups (264) and the application metadata (266) may be sent to backup storages for storage. The application backup agents (254) may perform all, or a portion, of the method illustrated in FIG. 5 when providing backup services for the applications (252).

Figure 3:
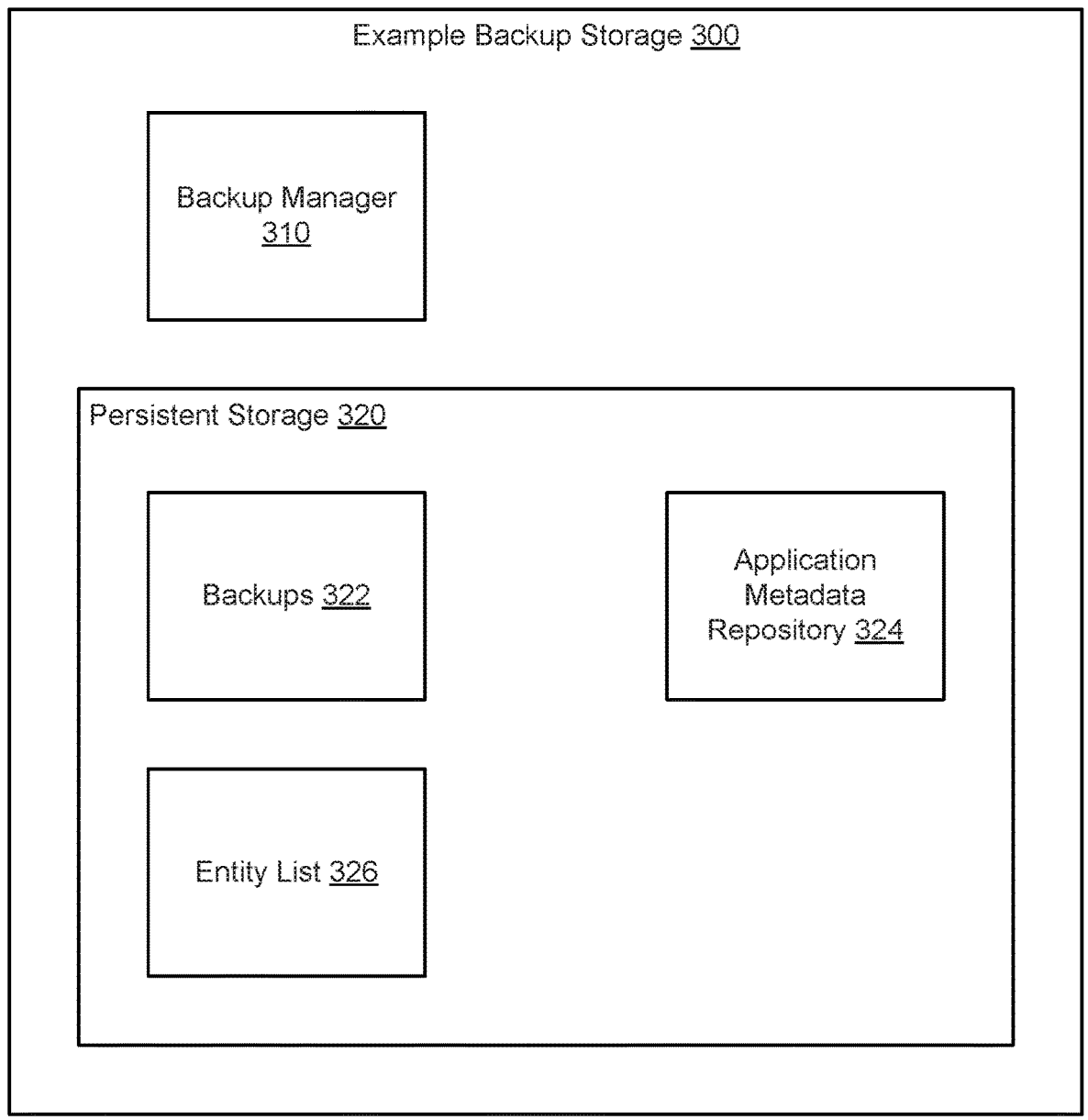
FIG. 3 shows a diagram of an example backup storage in accordance with one or more embodiments of the invention.

As discussed above, backups and/or application metadata may be sent to backup storages for data integrity purposes. FIG. 3 shows a diagram of an example backup storage (300) in accordance with one or more embodiments of the invention. The example backup storage (300) may be similar to any of the backup storages (120, FIG. 1). As discussed above, the example backup storage (300) may store data such as backups that may be used for restoration purposes. Additionally, the example backup storage (300) may limit access to backups to reduce the likelihood of data breaches caused by restorations of entities using the backups.

To provide the aforementioned functionality of the example backup storage (300), the example backup storage (300) may include a backup manager (310) and a persistent storage (320). Each component of the example backup storage (300) is discussed below.

In one or more embodiments of the invention, the backup manager (310) provides data storage services. For example, the backup manager (310) may orchestrate the storage of backups from production hosts in persistent storage (320) resulting in the storage of backups (322). In another example, the example backup storage (300) may provide information regarding the backups (322) to a user that is attempting to perform a restoration. When providing such information regarding the backups (322), the example backup storage (300) may limit access to the information depending on an identity of the user. By doing so, the likelihood of a data breach occurring may be reduced.

In one or more embodiments of the invention, the backup manager (310) restoration services. Restoration services may include providing information regarding the backups (322) to a user and providing copies of the backups (322) to production hosts for restoration purposes. When providing information regarding the backups to the user and/or the backups (322) to a production host, the backup manager (310) may perform all, or a portion of the method of FIGS. 4.1-4.2. For example, the backup manager (310) may identify a user querying the example backup storage (300) to determine which entities may be restored to any number of states using the backups (322), based on the identity of the user, the backup manager (310) may limit the information provided to the user regarding the restorable entities, and may perform a restoration of an entity using input obtained from the user. By doing so, the backup manager (310) may limit the ability of user to obtain information regarding the backups (322) stored in the example backup storage (300) and limit the ability of the user to access the backups (322) through performance of a restoration.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

In one or more embodiments of the invention, the persistent storage (320) is a data storage device. For example, the persistent storage (320) may be any combination of hard disk drives, solid state disk drives, tape drives, and/or any other physical storage medium for the storage of data. The persistent storage (320) may store the backups (322), application metadata repository (324) repository, and an entity list (326). Each of these data structures is discussed below.

The backups (322), as discussed above, may be data structures that include information that may be used to restore entities. The backups (322) may include any number and type of backup.

The application metadata repository (324) may a data structure storing the application metadata generated by the production hosts. As discussed above, application metadata may include information regarding users that have sufficient access credentials to access applications that generated the application data included in a corresponding backup. The application metadata repository (324) may include any quantity of application metadata.

The entity list (326) may be a data structure including information regarding the entities that may be restored using the backups (322). For example, as backups are stored in the persistent storage (320), the entity list (326) may be continuously updated to reflect the entities and corresponding states of the entities that may be restored using the backups (322). The entity list (326) may, for example, specify a list of restorable entities, the applications hosted by each of the restorable entities, and the state to which the entities and/or hosted application may be restored. The entity list (326) and the application metadata repository (324) may be used to determine the information (e.g., less than all of the available information if the user has insufficient access credentials) to provide to any user regarding the entities that may be restored, the applications that may be restored, and the corresponding states to which the entities and/or applications may be restored.

While the example backup storage (300) of FIG. 3 has been described and illustrated as including a limited number of components for the sake of brevity, a backup storage in accordance with embodiments of the invention may include additional, fewer, and/or different components than those illustrated in FIG. 3 without departing from the invention.

Returning to FIG. 1, the backup storages may provide data storage and restoration services. FIGS. 4.1-4.2 illustrates methods that may be performed by components of the system of FIG. 1 when providing such restoration services.

FIG. 4.1 shows a flowchart of a method in accordance with one or more embodiments of the invention. The method depicted in FIG. 4.1 be used to provide restoration services in accordance with one or more embodiments of the invention. The method shown in FIG. 4.1 may be performed by, for example, a backup storage (e.g., 120, FIG. 1). Other components of the system illustrated in FIG. 1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a restoration availability request is obtained from a user. The restoration availability request may be a request for information regarding the entities (e.g., virtual machines) and/or applications may be restored using backups stored in the backup storages.

In step 402, the user is identified.

In one or more embodiments of the invention, the user is identified by querying an application access manager. The application access manager may maintain application access credentials for each user. The application access credentials may specify the applications and/or application data to which the user is authorized to access. The application access manager may specify the applications and/or application data to which the user is authorized to access in response to the request. The user may be identified via other methods without departing from the invention.

In step 404, an entity list is filtered based on the identity of the user to obtain an available entity list.

In one or more embodiments of the invention, the entity list specifies all of the entities and/or applications that may be restored using backups stored in the backup storages.

In one or more embodiments of the invention, the entity list is filtered by only adding entities that host at least one application for which the user is authorized to access to the available entity list. By doing so, the available entity list may specify a portion of the entities included in the entity list.

In one or more embodiments of the invention, the entity list is filtered by only adding entities that host application data for which the user is authorized to access to the available entity list. By doing so, the available entity list may specify a portion of the entities included in the entity list.

In one or more embodiments of the invention, restrictions on the available entity list are placed if the user is not authorized to access all of the application and/or application data hosted by entities on the available entity list. For example, if a user is only authorized to access one of two applications hosted by an entity, the entity may be restricted to indicate that only partial access is allowed. Such restrictions may be utilized when generating a graphical user interface presented to a user, as will be discussed in greater detail with respect to step 406.

The resulting available entity list may be a list of entities and a list of restrictions on each of the corresponding entities.

In one or more embodiments of the invention, the entity list is filtered via the method illustrated in FIG. 4.2. The entity list may be filtered via other methods without departing from the invention.

In step 406, the available entity list is displayed to the user.

In one or more embodiments of the invention, the available entity list is displayed to the user by generating a graphical user interface. The graphical user interface may include graphical representations corresponding to each of the entities in the available entity list. For example, the graphical representations may be names of the entities arranged in a list.

In one or more embodiments of the invention, the graphical user interface includes information regarding each of the entities specified in the available entity list. The information regarding each of the entities specified in the available entity list may be a listing of the applications and/or application data hosted by each of the entities. For example, the graphical user interface may be a table including a first column that include a graphical representation of each of the entities in the available entity list and a second column that includes information corresponding to each the entities specified in the available entity list.

Such information may be utilized by a user to select an entity for restoration via the graphical user interface. For example, the user may select, via user input, one of the graphical representations of the entities included in the graphical user interface. Once selected, the entity may be restored by instantiating a copy of the entities in a predetermined state using the backups in the backup storage.

In one or more embodiments of the invention, any restrictions specified by the available entity list are used to modify the graphical user interface. The restrictions may be used to mask and/or remove information from the graphical user interface.

For example, if a restriction specifies that a user does not have authorization to access an application hosted by an entity, information regarding the application may be removed or masked in the generated graphical user interface. The information may be removed by not displaying it. The information may be masked by replacing the information with other characters (or other graphical representations) such as dashes, hyphens, black stars, etc. that indicate that information is present but not available to the user.

In one or more embodiments of the invention, the graphical user interface is generated to include at least one graphical representation of an entity that hosts applications to which the user does not have any access privileges. In such scenarios, all information regarding the applications hosted by the entity may not be displayed to the user or may be otherwise masked, as discussed above. By doing so, an indication of the availability of other entities that host other applications and/or application data may be provided to the user without providing details regarding the applications and/or application data. Further, doing so may prevent a user access to the applications and/or application data hosted by such entities by limiting the amount of information provided via the graphical user interface.

In step 408, an entity of the available entity list is identified based on user input obtained from the display of the available entity list. For example, as described with respect to step 406, user may select one of the entities via the graphical user interface. The user may click, box, select, etc. a portion of the user interface corresponding to the entity via the graphical user interface. The selection by the user may be the user input that may be used to identify the entity.

In step 410, the identified entity is restored.

In one or more embodiments of the invention, the entity is restored using backups in the backup storage. For example, any number of backups corresponding to the entity may be sent to a production host. In turn, the production host may instantiate the entity using the sent backups.

In one or more embodiments of the invention, the restoration of the entity is restricted based on any restrictions corresponding to the selected entity of step 408. As discussed with respect to step 404, entities may have restrictions based on the access authorizations of the user and the applications/application data hosted by the entity. If the entity selected in step 408 has any restrictions, the restoration of the entity may be modified to limit the applications and/or application data hosted by the restored entity.

In one or more embodiments of the invention, additional instructions are sent, along with the backups, that cause applications and/or application data to be removed from the restored entity prior to client access to the restored entity may be granted. By doing so, the restored entity may only include applications and/or application data to which the user that sent the restoration availability request in step 400 is authorized to access.

The method may end following step 410.

By implemented the method of FIG. 4.1, only entities for which a user is authorized to access all of its applications and/or application data may be restored. Doing so may reduce the likelihood of improper access to data.

FIG. 4.2 shows a flowchart of a method in accordance with one or more embodiments of the invention. The method depicted in FIG. 4.2 may be used to obtain an available entity list in accordance with one or more embodiments of the invention. The method shown in FIG. 4.2 may be performed by, for example, a backup storage (e.g., 120, FIG. 1). Other components of the system illustrated in FIG. 1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

The following method may be used to filter an entity of an entity list. The method may be repeated for all, or a portion of the entities in the entity list.

In step 420, an entity of the entity list to be selected. The entity may not have been previously filtered. In other words, the selected entity from the entity list may not have been previously selected as part of filtering the entity list.

In step 422, all applications hosted by the selected entity are identified. For example, a list of the applications hosted by the selected entity may be generated.

In step 424, it is determined whether the user has access privileges for any of the applications. The determination may be made by comparing the applications to which the user is authorized to access to the identified applications hosted by the selected entity. If the user is authorized access to any one of the identified applications, the user is determined as having access to one of the applications.

If the user is determined as having access to any of the applications, the method may proceed to step 426. If the user is determined as not having access to any of the applications, the method may end following step 424.

In step 426, the selected entity is added to the available entity list. The selected entity may be added to the available entity list by adding an entry to the available entity list specifying the selected entity. The specification may be, for example, the name of the selected entity or another identifier.

In step 428, it is determined whether the user has limited access privileges to the identified applications. As discussed above, users may only be authorized to access a limited set of applications. The determination may be made by identifying whether the user does not have access to anyone of the identified applications.

If it is determined that the user has limited access privileges to the identified applications, the method may proceed to step 430. If it is determined that the user has access privileges to all of the identified applications, the method may end following step 428.

In step 430, the selected entity in the available entity list is restricted.

In one or more embodiments of the invention, the selected entity and the available entry list is restricted by adding information to the available entry list indicating that the selected entity is restricted. The information may specify the applications and/or application data to which the user is not authorized to access.

For example, consider a scenario in which a user only has access to a single application hosted by the selected entity. In such a scenario, identifiers of each of the applications hosted by the selected entity which the user is not authorized to access may be added to the available entity list.

The method may end following step 430.

By implementing the method of FIG. 4.2, access limitations may be specified for entities available for restoration to a particular user. Doing so may enable restorations to be appropriately limited so that inadvertent access to data, via the restored entity, by an unauthorized user may be prevented.

As discussed above, production hosts may generate backups so that they may be restored (all or in part). By doing so, the likelihood of losing data that is relevant to clients may be reduced.

Figure 5:
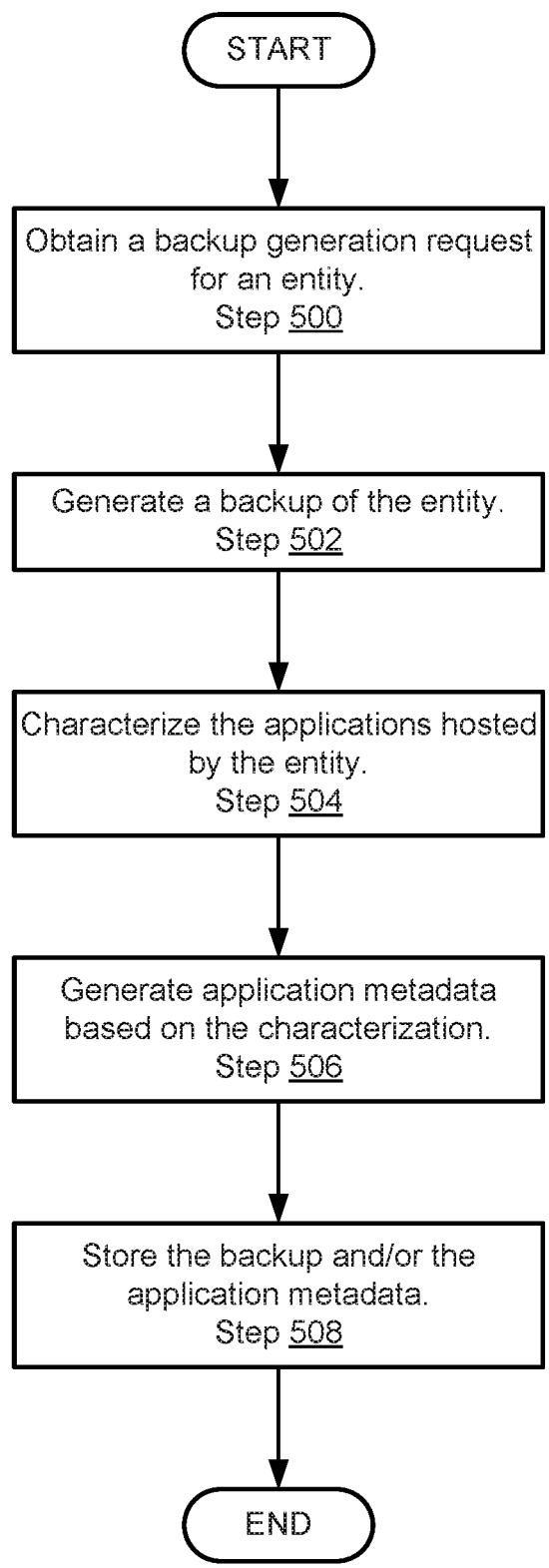
FIG. 5 shows a flowchart of a method of generating a backup in accordance with one or more embodiments of the invention.

FIG. 5 shows a flowchart of a method in accordance with one or more embodiments of the invention. The method depicted in FIG. 5 be used to perform a backup in accordance with one or more embodiments of the invention. The method shown in FIG. 5 may be performed by, for example, a production host (e.g., 120, FIG. 1). Other components of the system illustrated in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a backup generation request for an entity is obtained.

In one or more embodiments of the invention, the backup generation request is obtained from a remote agent. The remote agent may send a request in accordance with the backup policy. The backup generation request may be obtained from other entities without departing from the invention.

In one or more embodiments of the invention, the entity is a virtual machine hosted by the production host that obtained the backup generation request.

In one or more embodiments of the invention, the entity is an application hosted by a virtual machine that is hosted by the production host that obtained the backup generation request.

In step 502, a backup of the entity is generated.

In one or more embodiments of the invention, the backup of the entity includes information may be used to restore the entity to a state of the entity at the time the backup is generated. The backup may be at any level of granularity without departing from the invention.

In step 504, the applications hosted by the entity are characterized.

In one or more embodiments of the invention, characterizing the applications hosted by the entity identifies the applications. For example, the identity of each application hosted by an entity may be determined via the characterization.

In one or more embodiments of the invention, the applications are characterized using access credentials maintained by an application access manager. For example, the application access manager may include a listing of all the applications hosted by all of the production hosts of the system. Each of the applications may be matched to corresponding applications specified in the listing. The matching may be performed via any method without departing from the invention.

In step 506, application metadata is generated based on the characterization.

In one or more embodiments of the invention, the application metadata specifies all of the applications hosted by the entity. The application metadata may also specify all of the users that are authorized to access each of the applications hosted by the entity. Such information may be obtained and included in the metadata via the application access manager.

For example, the users authorized to access each the applications may be determined from the listing maintained by the application access manager. The application metadata may be generated by creating a list of each of the applications and the corresponding users that are authorized to access each of the applications.

In step 508, the backup and/or the application metadata is stored in backup storage.

In one or more embodiments of the invention, the application metadata is stored in an application metadata repository hosted by the backup storage. Each of the backup storages may cooperatively update the application metadata repository (324) to maintain a global data structure that represents all of the application metadata.

In one or more embodiments of the invention, the backup and/or the application metadata is stored in the backup storage by sending these data structures to the backup storage. In turn, the backup storage may appropriately process the sent data structures for long term storage.

The method may end following step 508.

Using the method illustrated in FIG. 5, backups may be stored in backup storage while also providing appropriate information to the backup storages such that access to the backups may be limited to reduce the likelihood of unauthorized data access by users.

To further clarify embodiments of the invention, a non-limiting example is provided in FIGS. 6.1-6.7. Each of these figures may illustrate a system similar to that illustrated in FIG. 1 at different points in times. For the sake of brevity, only a limited number of components are illustrated in each of FIGS. 6.1-6.7.

EXAMPLE

Consider a scenario as illustrated in FIG. 6.1 in which the production host (600) hosts the first virtual machine (602) and a second virtual machine (604). The first virtual machine (602) hosts a database application and (602.2) the customer contact application (602.4). The second virtual machine (604) hosts an instant messaging application (604.2).

For data integrity purposes, the backup storage (610) as illustrated in FIG. 6.2 stores a first virtual machine backup (612) of the first virtual machine (602) and a second virtual machine backup (614) of the second virtual machine (604). To provide restoration services, the backup storage (610) stores an entity list (616) reflecting that the first and second virtual machines may be restored using the backups stored in the backup storage (610).

At a first point in time, the production host (600) fails. A first user (not shown) impacted by the failure sends a request to the backup storage (610) to identify which entities hosted by the production host (600) may be restored using the backups in the backup storage (610).

In response to the request, the backup storage (610) queries an application access manager (620) as illustrated in FIG. 6.3 to determine the application access credentials of the first user. As seen from FIG. 6.3, the first user credentials (622) only indicate that the first user is allowed to access the database application (602.2) hosted by the first virtual machine (602).

In response to determining the access credentials of the first user, the backup storage generates a first graphical user interface (630) as shown in FIG. 6.4 by filtering the entity list (616) based on the first user credentials (622). The first graphical user interface (630) includes a first graphical representation (632.2) that indicates that the first virtual machine is available for restoration. The first graphical user interface (630) also includes first virtual machine information (634.2) that indicates that the first virtual machine hosts a database application and another application to which the first user is not provided access.

Unfortunately, the first user desired to restore access to the instant messaging application. Because of the first user's limited access credentials, the first user was not shown information included in the first graphical user interface (630) that would allow the first user to determine that an entity could be restored that provided the instant messaging application services.

The first user then asks a second user to attempt to perform a restoration. The second user sends a request to the backup storage (610) to identify which entities hosted by the production host (600) may be restored using the backups in the backup storage (610).

In response to the request from the second user, the backup storage (610) queries the application access manager (620) as illustrated in FIG. 6.3 to determine the application access credentials of the second user. As seen from FIG. 6.3, the second user credentials (624) indicate that the second user is allowed to access the database application (602.2) hosted by the first virtual machine (602) and the instant message application (604.2) hosted by the second virtual machine (604).

In response to determining the access credentials of the second user, the backup storage generates a second graphical user interface (640) as shown in FIG. 6.5 by filtering the entity list (616, FIG. 6.2) based on the second user credentials (624, FIG. 6.3). The second graphical user interface (640) includes a first graphical representation (642.2) that indicates that the first virtual machine is available for restoration. The first graphical user interface (630) also includes first virtual machine information (634.2) that indicates that the first virtual machine hosts a database application and a second application to which the second user is not provided access. In place of where the information regarding the second application would appear, "***************" is included to indicate the presence of the second application without disclosing other information regarding the second application.

The second graphical user interface (640) further includes a second graphical representation (642.4) that indicates that the second virtual machine is available for restoration. The second graphical user interface (640) also includes second virtual machine information (644.4) that indicates that the second virtual machine hosts the instant message application.

Using the second graphical user interface (640), the second user selects both of the virtual machines for restoration. In response to the selection by the second user, the backup storage performs a restoration by instantiating a first new virtual machine (652) and a second new virtual machine (654) and a new production host (650) as illustrated in FIG. 6.6. Upon instantiation, the first new virtual machine (652) hosts an instant message application (652.2) and the second new virtual machine (654) hosts a database application (654.2) and a customer contact application (654.4).

Prior to allowing access to these instantiated virtual machines, the customer contact application (654.4) and its associated application data are removed from the second new virtual machine (654) as illustrated in FIG. 6.7. In the state illustrated in FIG. 6.7, End of Example As seen from FIGS. 6.1-6.7, embodiments of the invention may provide for the selective restoration of entities based on user access credentials. By doing so, the likelihood of unauthorized data access caused by restorations of entities in a distributed system may be reduced.

Figure 7:
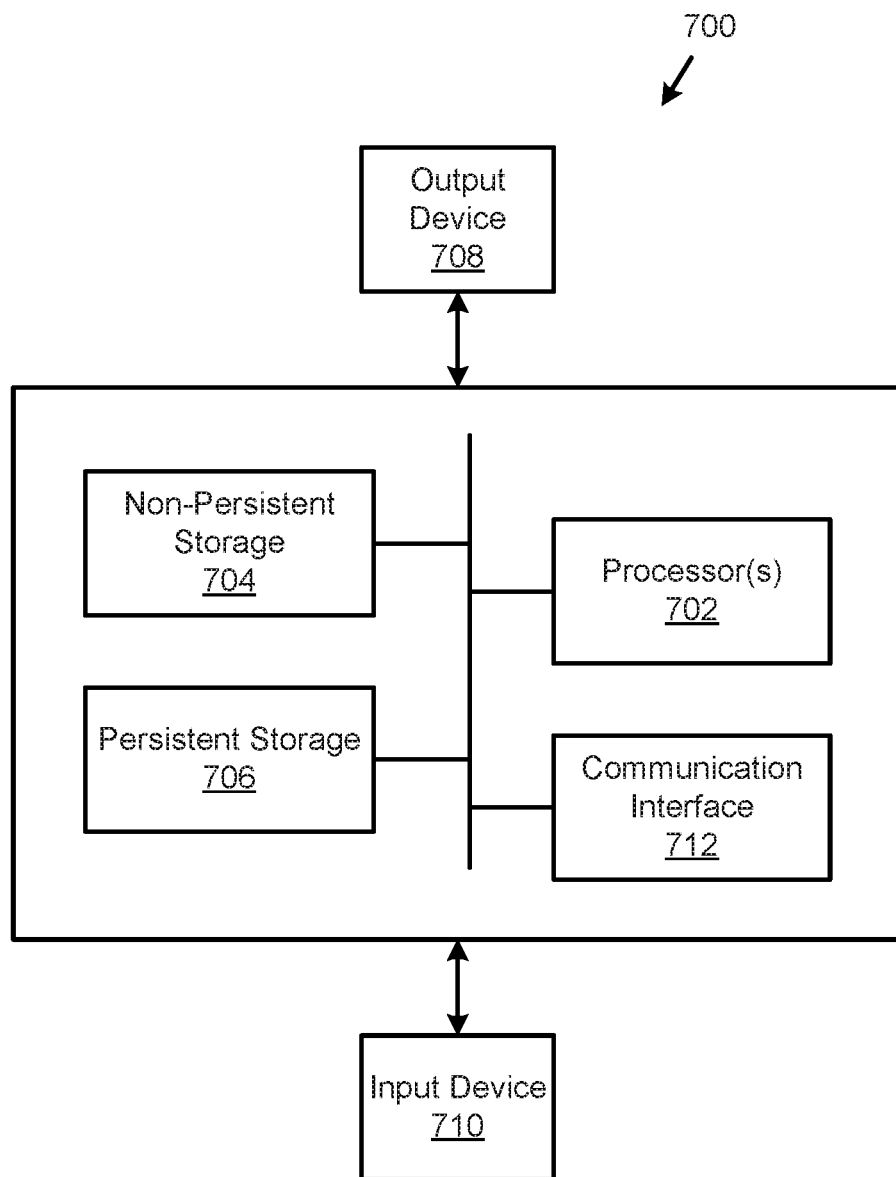
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may reduce the likelihood of unauthorized data access in a distributed environment that relies on data replication for information storage reliability purposes. Embodiments of the invention may provide a method of performing restorations using backups that is less likely to contribute to unauthorized data access and contemporary methods for performing restorations.

Thus, embodiments of the invention may address the problem of unauthorized data access in a distributed system. By limited the ability of users to determine the availability of backups of entities within the distributed system, embodiments of the invention may reduce the likelihood of unauthorized users from gaining access to data.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup storage, comprising:
 a persistent storage for storing:
  backups of entities, and
  an entity list that lists the entities; and
 a backup manager programmed to:
  obtain a restoration availability request from a user;
  select an entity specified by the entity list;
  make a determination, based on an identity of the user, that the user has access privileges for an application hosted by the entity;
  in response to the determination, add the selected entity to an available entity list;
  obtain user input using a graphical user interface based on the available entity list;
  identify, based on the user input, an entity of the entities; and
  restore the entity using the backups.

2. The backup storage of claim 1, wherein obtaining the user input comprises:
 generating the graphical user interface based on a portion of the entities that is specified by the available entity list;
 displaying the graphical user interface to the user; and
 obtaining the user input that indicates selection of the entity using the graphical user interface.

3. The backup storage of claim 2, wherein generating the graphical user interface based on the portion of the entities that is specified by the available entity list comprises:
 generating graphical representations of the entities specified in the available entity list in the graphical user interface.

4. The backup storage of claim 3, wherein one of the graphical representations masks data hosted by one of the entities.

5. The backup storage of claim 3, wherein the graphical representations of the entities specified in the available entity list illustrates data hosted by the entities.

6. The backup storage of claim 1, wherein the backup manager is further programmed to:
 make a second determination, based on the identity of the user, that the user does not have access privileges for all applications hosted by the entity; and
 in response to the determination, add an available entity list restriction, based at least in part on a second application of the applications hosted by the entity, for the selected entity to the available entity list.

7. A method for performing restorations, comprising:
obtaining a restoration availability request from a user;
selecting an entity specified by an entity list, wherein the entity list specifies entities available for the restorations;
making a determination, based on an identity of the user, that the user has access privileges for an application hosted by the entity;
in response to the determination, adding the selected entity to an available entity list to obtain the available entity list;
obtaining user input using a graphical user interface based on the available entity list;
identifying, based on the user input, an entity of the entities; and
restoring the entity using a backup of the entities.

8. The method of claim 7, wherein obtaining the user input comprises:
generating the graphical user interface based on a portion of the entities that is specified by the available entity list;
displaying the graphical user interface to the user; and
obtaining the user input that indicates selection of the entity using the graphical user interface.

9. The method of claim 8, wherein generating the graphical user interface based on the portion of the entities that is specified by the available entity list comprises:
generating graphical representations of the entities specified in the available entity list in the graphical user interface.

10. The method of claim 9, wherein one of the graphical representations masks data hosted by one of the entities.

11. The method of claim 9, wherein the graphical representations of the entities specified in the available entity list illustrates data hosted by the entities.

12. The method of claim 7, wherein the method further comprises:
making a second determination, based on the identity of the user, that the user does not have access privileges for all applications hosted by the entity; and
in response to the determination, adding an available entity list restriction, based at least in part on a second application of the applications hosted by the entity, for the selected entity to the available entity list.

13. A non-transitory computer readable medium comprising computer readable program code, which when executed by a computer processor enables the computer processor to perform a method for performing restorations, the method comprising:
obtaining a restoration availability request from a user;
selecting an entity specified by an entity list, wherein the entity list specifies entities available for the restorations;
making a determination, based on an identity of the user, that the user has access privileges for an application hosted by the entity;
in response to the determination, adding the selected entity to an available entity list to obtain the available entity list;
obtaining user input using a graphical user interface based on the available entity list;
identifying, based on the user input, an entity of the entities; and
restoring the entity using a backup of the entities.

14. The non-transitory computer readable medium of claim 13, wherein obtaining the user input comprises:
generating the graphical user interface based on a portion of the entities that is specified by the available entity list;
displaying the graphical user interface to the user; and
obtaining the user input that indicates selection of the entity using the graphical user interface.

15. The non-transitory computer readable medium of claim 14, wherein generating the graphical user interface based on the portion of the entities that is specified by the available entity list comprises:
generating graphical representations of the entities specified in the available entity list in the graphical user interface.

16. The non-transitory computer readable medium of claim 15, wherein one of the graphical representations masks data hosted by one of the entities.

17. The non-transitory computer readable medium of claim 15, wherein the graphical representations of the entities specified in the available entity list illustrates data hosted by the entities.

* * * * *